(12) United States Patent
Pasupuleti et al.

(10) Patent No.: US 10,785,498 B2
(45) Date of Patent: Sep. 22, 2020

(54) SYSTEM AND METHOD OF MAPPING MULTIPLE REFERENCE FRAME MOTION ESTIMATION ON MULTI-CORE DSP ARCHITECTURE

(71) Applicant: SQUID DESIGN SYSTEMS PVT LTD, Hyderabad (IN)

(72) Inventors: Venkata Suresh Babu Pasupuleti, Hyderabad (IN); Satyanarayana Uppalapati, Hyderabad (IN); Govinda Siva Prasad Vabbalareddy, Hyderabad (IN); Kishor Simma, Hyderabad (IN)

( * ) Notice: Subject to any disclaimer, the term of this patent is extended or adjusted under 35 U.S.C. 154(b) by 0 days.

(21) Appl. No.: 14/647,142

(22) PCT Filed: Nov. 25, 2013

(86) PCT No.: PCT/IB2013/060374
§ 371 (c)(1),
(2) Date: May 26, 2015

(87) PCT Pub. No.: WO2014/083491
PCT Pub. Date: Jun. 5, 2014

(65) Prior Publication Data
US 2015/0304679 A1    Oct. 22, 2015

(30) Foreign Application Priority Data
Nov. 27, 2012   (IN) ............................ 4925/CHE/2012

(51) Int. Cl.
*H04N 7/12* (2006.01)
*H04N 19/52* (2014.01)
(Continued)

(52) U.S. Cl.
CPC ........... *H04N 19/52* (2014.11); *H04N 19/127* (2014.11); *H04N 19/42* (2014.11); *H04N 19/43* (2014.11);
(Continued)

(58) Field of Classification Search
CPC ...... H04N 19/52; H04N 19/127; H04N 19/42; H04N 19/43; H04N 19/567; H04N 19/573;
(Continued)

(56) References Cited

U.S. PATENT DOCUMENTS

| 2006/0018381 A1* | 1/2006 | Luo | ......................... H04N 5/145 375/240.16 |
| 2008/0063062 A1* | 3/2008 | Zhao | .................... H04N 19/176 375/240.16 |
| 2009/0003451 A1* | 1/2009 | Lin | ......................... H04N 19/52 375/240.16 |

* cited by examiner

*Primary Examiner* — Sath V Perungavoor
*Assistant Examiner* — Peet Dhillon
(74) *Attorney, Agent, or Firm* — Steven A. Nielsen; www.NielsenPatents.com

(57) ABSTRACT

System and method of mapping multiple reference frame motion estimation on a multi core digital signal processor is disclosed. The method includes considering at least one motion vector of a plurality of neighbouring macro blocks present in a current frame and a co-located frame to find a best prediction point motion vector set, collecting a best data block among a plurality of data blocks from a plurality of reference frames according to a plurality of sets of motion vectors at a first pipeline stage, transmitting a data searched related to the plurality of sets of motion vectors from the second level of memory to a first level of memory of a second digital signal processor at a second pipeline stage and finding a best motion vector by utilizing a cost based search on the second digital signal processor is performed at third pipeline stage.

10 Claims, 11 Drawing Sheets

(51) Int. Cl.

| | |
|---|---|
| *H04N 19/127* | (2014.01) |
| *H04N 19/42* | (2014.01) |
| *H04N 19/43* | (2014.01) |
| *H04N 19/567* | (2014.01) |
| *H04N 19/573* | (2014.01) |
| *H04N 19/59* | (2014.01) |
| *H04N 19/433* | (2014.01) |
| *H04N 19/436* | (2014.01) |
| *H04N 19/513* | (2014.01) |

(52) U.S. Cl.
CPC ......... *H04N 19/433* (2014.11); *H04N 19/436* (2014.11); *H04N 19/521* (2014.11); *H04N 19/567* (2014.11); *H04N 19/573* (2014.11); *H04N 19/59* (2014.11)

(58) Field of Classification Search
CPC .... H04N 19/59; H04N 19/433; H04N 19/436; H04N 19/521
See application file for complete search history.

SYSTEM AND METHOD OF MAPPING MULTIPLE REFERENCE FRAME MOTION ESTIMATION ON MULTI-CORE DSP ARCHITECTURE

TECHNICAL FIELD OF THE INVENTION

The present invention generally relates to video processing systems. More particularly the present invention relates to a method and system of mapping a motion estimation using multiple reference frames by utilizing an integer-pixel motion estimation and fractional-pixel motion estimation in multiple pipeline stages.

BACKGROUND OF THE INVENTION

Generally, to transmit video data over band-limited communication channels and to store on compact storage devices an efficient data compression technique is required to represent the video data. The video data transfer is in the form of bit streams comprising a series of two dimensional images consisting of a number of horizontally and vertically placed pixels.

Typically, to remove the temporal redundancy between the consecutive images of video data an efficient motion estimation algorithm is required to encode any video data. There are different types of encoding standards among them one of the methods conventionally used for the compression of video data into macro blocks is inter/intra block coding. Each individual macro block is either coded as intra/inter, wherein intra block coding is used for exploiting spatial correlation and inter block coding for exploiting temporal correlation. Inter block coding is mostly used for predicting the macro blocks of the current frame from the previous reference frames whereas the intra block coding is used for macro blocks with high spatial correlation.

Conventionally, the method used for encoding the video data is "perform motion estimation at block levels". The image is divided into macro blocks and each macro block is searched across the previous reference frames to find out the best match and sent the motion vector of best match to the decoder. Therefore to select the best motion vector a rate-distortion cost is used to find out the best motion vector in the set of motion vectors available in the search window. But, in the above video coding standard techniques used to represent the best match information the number of divisions of macro blocks are limited up to the size of the macro block.

Typically, to overcome the above mentioned video coding technique for a limited block size of a motion estimation search, other methods have been used for finding the best match information. These methods are capable of finding the best match at different block sizes and are also able to use the n-stage motion estimation search patterns to find the best motion vector. Thus the process of finding this n-stage motion estimation search is possible by calculating the cost factor of individual partition and the entire macro block. But the conventional n-stage search method used for finding the best search point is able to represent only a single motion vector in a single stretch.

Furthermore, multiple reference frames are used to find the best match of a block. The original data block coming out from the current frame and the predicted data block taken from the reference frame are used to calculate the rate distortion cost. Initially best reference frame is searched that matches the data block present in the current frame and finds the best partition mode of each sub block to find the best match of a block. But finding of rate distortion costs and performing motion estimation over the multiple reference frames involves more complexity when compared to that of single reference frame cases.

In the light of aforementioned limitations, there exists a need of finding a best motion vector by mapping a motion estimation algorithm on a multi-core digital signal processor, considering the motion vectors of neighbouring macro blocks of both current frame and co-located frame by utilizing multiple pipeline stages.

BRIEF SUMMARY OF THE INVENTION

The following presents a simplified summary of the disclosure in order to provide a basic view/idea, it does not identify key/critical elements of the invention or delineate the scope of the invention. Its sole purpose is to present some concepts disclosed herein in a simplified form as a prelude to the more detailed description that is presented later.

Exemplary embodiments of the present invention are directed towards a system and method of performing motion estimation in multiple reference frames.

According to a first aspect, a method of mapping motion estimation using multiple reference frames on a multi core digital signal processor is disclosed. The method includes considering at least one motion vector of a plurality of neighbouring macro blocks present in a current frame and a co-located frame to find a best prediction point motion vector set. A current macro block of the current frame and an at least one neighbouring macro block of the current frame are co-related with a co-located macro block of the co-located frame and at least one neighbouring macro block of the co-located frame.

According to the first aspect, the method includes collecting a best data block among a plurality of data blocks from a plurality of reference frames according to a plurality of sets of motion vectors. The collected best data block is to be transferred from an external memory to a second level of memory at a first pipeline stage.

According to the first aspect, the method includes transmitting a data searched related to the plurality of sets of motion vectors from the second level of memory to a first level of memory of a second digital signal processor at a second pipeline stage.

According to the first aspect, the method includes mapping a best predictive motion vector by utilizing a cost based search on the second digital signal processor at a third pipeline stage includes finding a best predictive motion vector by considering a plurality of adjacent motion vectors present in a plurality of neighbouring macro blocks and an availability status of a left macro block, finding a cost factor of each motion vector from a plurality of set of motion vectors and assigns a plurality of results obtained by calculating the cost factor of each motion vector to a plurality of input registers of a motion estimation engine and performing a cost based motion search to find a best predictive motion vector from a plurality of set of predictive motion vectors.

According to a second aspect, a method of mapping an integer pixel based motion estimation by utilizing multiple reference frames on a multi core digital signal processor is disclosed. According to the second aspect, the method includes collecting a plurality of set of centre motion vectors at an end of the third pipeline stage to perform an exhaustive motion search for a $n^{th}$ reference frame by selecting a motion search area around a centre motion vector.

According to the second aspect, the method includes transmitting a plurality of reference frame buffers of a searched reference frame from an external memory to a second level of memory at a fourth pipeline stage by fetching a search area present around the selected centre motion vector.

According to the second aspect, the method includes transmitting the fetched search area from the second level of memory to a first level of memory of a first digital signal processor by utilizing a dynamic memory access controller at a fifth pipeline stage.

According to the second aspect, the method includes performing an integer-pixel level of motion estimation for at least one reference frame in a sixth pipeline stage to find a best motion vector includes mapping a coarse-grain motion estimation in a first M-1 steps of a plurality of steps from an at least one reference frame search area by calculating a weight cost factor value and a sum of absolute difference value to determine a best search point in an at least one reference frame search area, mapping a fine-grain motion estimation in a last step of a plurality of steps from an at least one reference frames search area by calculating a weight cost factor value and a sum of absolute difference value to determine a best search point in an at least one reference frame search area and finding a best partition mode for the nth reference frame by calculating a minimum rate distortion cost at the maximum partition level among the plurality of partition levels and a minimum rate distortion cost at the remaining partition levels among the plurality of partition levels.

According to a third aspect, a method of mapping a fractional pixel based motion estimation by utilizing multiple reference frames on a multi core digital signal processor is disclosed. According to the third aspect, the method includes performing a half-pixel motion estimation to determine a best partition mode and a best search point at an eighth pipeline stage including the method of calculating a half-pixel motion estimation value around a centre motion vector resulted by an integer-pixel motion estimation through an interpolation process at a best partition level and configuring a motion estimation in a best partition mode and a best search point from a plurality of eight half-pixel points.

According to the third aspect, the method includes performing a quarter-pixel motion estimation to determine a best partition mode and a best search point at an eighth pipeline stage including a method of calculating a quarter-pixel motion estimation value around a best motion vector by utilizing an interpolation process at a best partition level and configuring a motion estimation in a best partition mode to determine a best search point from a plurality of eight quarter-pixel points.

According to the third aspect, the method includes finding a rate distortion cost of a plurality of prediction frame skip points and a plurality of bidirectional predictive frame skip points by compensating a motion of a plurality of motion vectors.

According to the third aspect, the method includes selecting a best motion vector between a motion vector resulted after calculating a quarter-pixel motion estimation and a plurality of prediction skip motion vectors and a bidirectional predictive motion vectors.

According to a fourth aspect, a system for mapping multiple reference frames motion estimation on a multi core digital signal processor is disclosed. According to the fourth aspect, the system includes a first digital signal processor in communication with a second digital signal processor through a data bus further includes a programmable motion estimation engine in communication with a first level of memory receives the data stored in the memory and a data centric processor in communication with a first level of memory and a programmable motion estimation engine to map a motion compensated data and a motion vector information of a best reference frame data.

According to the fourth aspect, the system includes a second level of memory in communication with the first digital signal processor, a second digital signal processor and an external memory to store a large amount of data buffers utilized for processing.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the present disclosure taken in conjunction with the accompanying drawings, wherein.

DETAIL DESCRIPTION OF THE INVENTION

Figure 1:
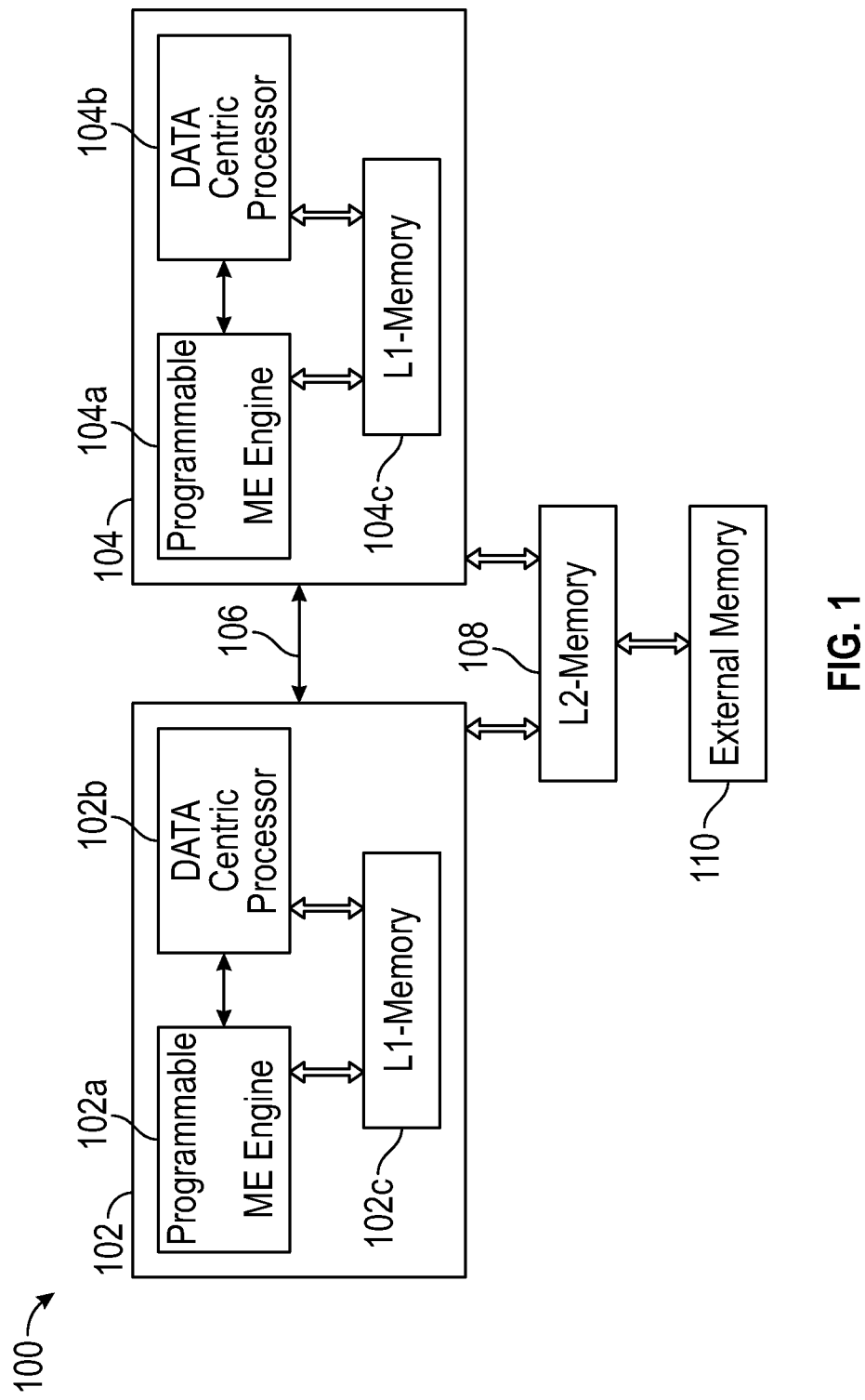
FIG. 1 is a block diagram depicting a multi core digital signal processor.

It is to be understood that the present disclosure is not limited in its application to the details of construction and the arrangement of components set forth in the following description or illustrated in the drawings. The present disclosure is capable of other embodiments and of being practised or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1 is a diagram 100 depicting a multi core digital signal processor. According to a non limiting exemplary embodiment of the present invention, the multi core digital signal processor is utilized for mapping a motion estimation process using multiple reference frames by utilizing a programmable motion estimation engine 102a, a data centric processor 102b and a first level of memory 102c included in a first digital signal processor 102. The first digital signal processor 102 in communication with a second digital signal processor 104 also includes a programmable motion estimation engine 104a, a data centric processor 104b and a first level of memory 104c through a data bus 106. The system also includes a second level of memory 108 in communication with the first digital signal processor 102 and the second digital signal processor 104 and also an external memory 110.

In accordance with a non limiting exemplary embodiment of the present invention, a programmable motion estimation engine 102a of a first digital signal processor 102 receives the data stored in the first level of memory 102c to perform motion estimation task for finding a best reference frame data from the multiple reference frames. The programmable estimation engine 102a is in communication with a data centric processor 102b to map a motion compensated data and a motion vector information of a best reference frame data and further the data centric processor 102b also communicates with a first level of memory 102c to store the best reference frame data. Similarly a second digital signal processor 104 in communication with the first digital signal processor 102 through a data bus 106 and a second level of memory 108 also performs the same process for finding the best reference frame from the multiple reference frames stored in a first level of memory 104c included in the second digital signal processor. The data stored in the first level of memory 104c of the second digital signal processor 104 is transferred to a programmable motion estimation engine 104a of second digital signal processor 104 to perform motion estimation task for finding a best reference frame data from the multiple reference frame by communicating with a data centric processor 104b included in the second digital signal processor 104.

According to a non limiting exemplary embodiment of the present invention, an external memory 110 in communication with a second level of memory 108 is used to store the huge data buffers which may include but not limited to a current frame buffers, reference frame buffers, stream buffers and the like. The motion estimation algorithm used in the system is a predictive based motion estimation algorithm to identify the type of motion search which may include but not limited to a full search, diamond search, three-step motion search and the like by finding a best prediction point motion vector from a set of predictive motion vectors.

Figure 2:
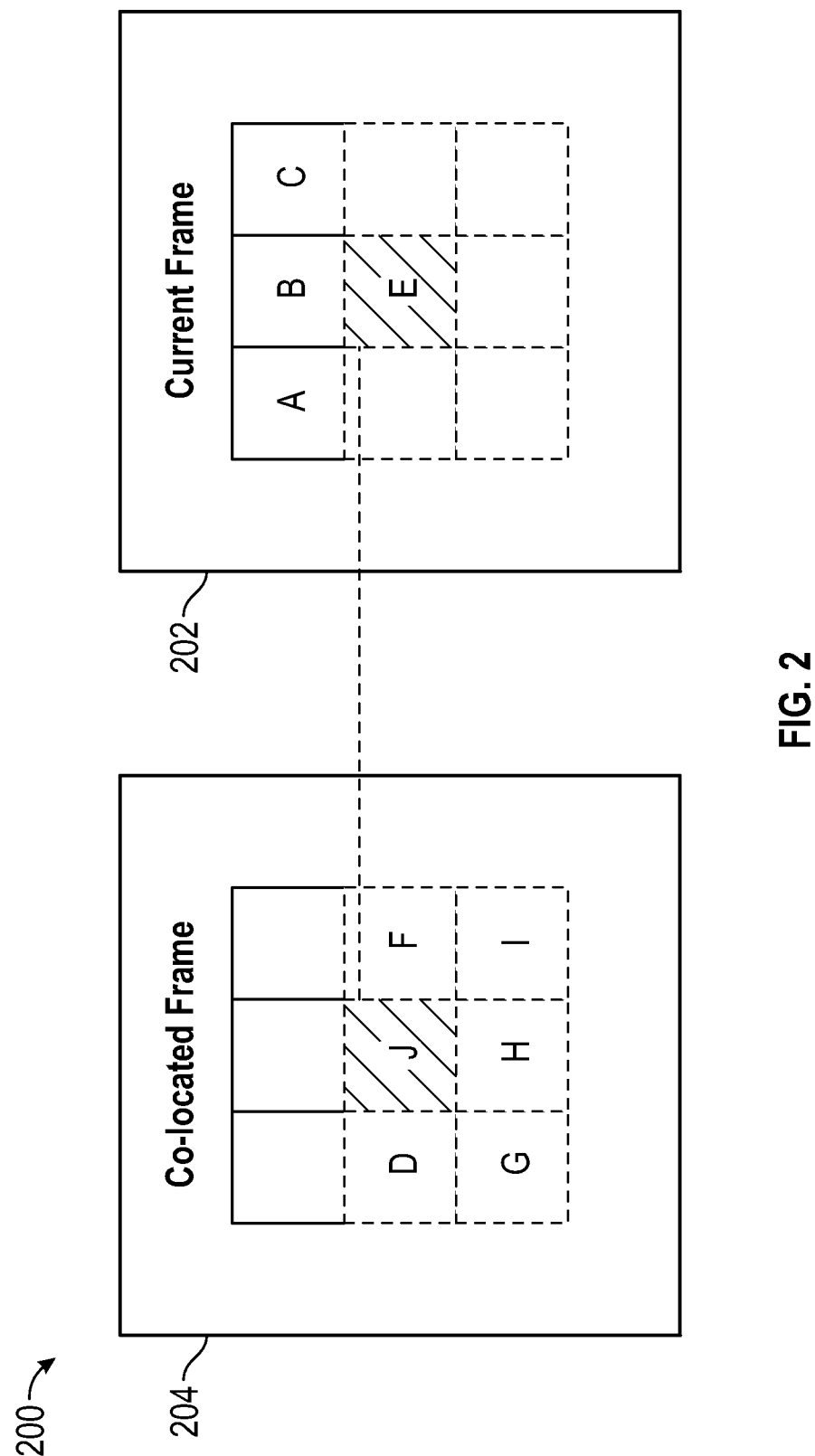
FIG. 2 is a diagram depicting a correlation between a current frame and a co-located frame.

Referring to FIG. 2 is a diagram 200 depicting a correlation between a current frame and a co-located frame. According to a non limiting exemplary embodiment of the present invention, the multiple reference frame motion estimation process includes a current frame 202 and a co-located frame 204 to correlate a current macro block of the current frame 202 with a co-located macro block of the co-located frame 204 and a neighbouring macro block of the current macro block with a neighbouring block of the co-located macro block by utilizing multiple pipeline stages.

In accordance with a non limiting exemplary embodiment of the present invention, the motion estimation is a predictive based motion estimation algorithm having an exhaustive motion search which may include but not limited to a full search, diamond search, 3-step search and the like identified by finding a best prediction point motion vector from a set of predictive motion vectors. The predictive motion vector set is formed by considering the multiple motion vectors of multiple neighbouring blocks present in the current frame 202 and the co-located frame 204 by utilizing multiple pipeline stages. The predictive motion vector set Sn={mv0, mv1, mv2, . . . } for $n^{th}$ reference frame are calculated in multiple stages by transmitting the data from an external memory to a second level of memory. Thus the method of finding the motion vector sets S0, S1, S2, . . . Sn-1 and transferring the corresponding 16×16 macro block data for each motion vector are both performed at a first pipeline stage PS0.

According to a non limiting exemplary embodiment of the present invention, the data searched with respect to the sets S0, S1, S2, Sn-1 is transferred from the second level of memory to a first level of memory included in the second digital signal processor by utilizing a dynamic memory access controller at a second pipeline stage PS1. Further at third pipeline stage PS2 the tasks performed in this stage for each reference frame is mapped on a second digital signal processor.

Figure 3:
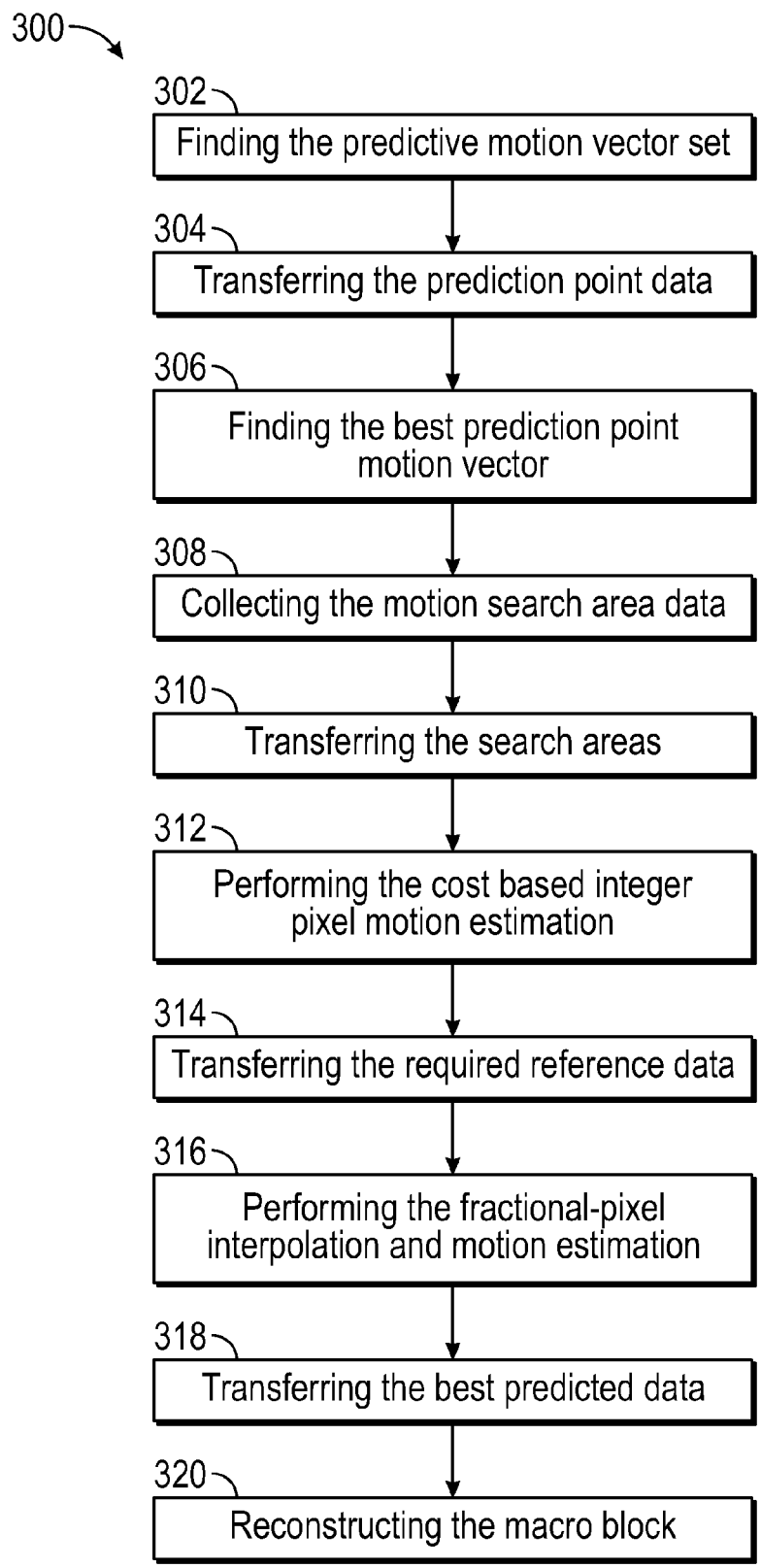
FIG. 3 is a flow diagram depicting a method employed for describing tasks performed in multiple pipeline stages.

Referring to FIG. 3 is a flow diagram 300 depicting a method employed for describing tasks performed in multiple pipeline stages. According to a non limiting exemplary embodiment of the present invention, the method used for describing the tasks performed at multiple pipeline stages starts at step 302 by finding the best predictive motion vector set and collect a maximum partition level which may include but not limited to a 16×16 level and the like block data corresponding to each motion vector from external memory by transferring to a second level of memory for each reference frame.

In accordance with a non limiting exemplary embodiment of the present invention, at step 304 the prediction point data is being transferred from second level of memory to a first level of memory by utilizing a dynamic memory access controller. Next at step 306 the best prediction point motion vector among the set of motion vectors is determined by utilizing the motion estimation engine separately for each reference frame. At step 308 the motion search area data collected around the best prediction point motion vector is transferred from the external memory to a second level of memory and further the search areas are transferred from the second level of memory to a first level of memory by using a dynamic memory access controller at step 310.

According to a non limiting exemplary embodiment of the present invention, at step 312 the cost based integer-pixel motion estimation engine is performed by using a motion estimation engine for each reference frame. Next at step 314 the required reference data present around the best integer-pixel is transferred from second level of memory to a first level of memory to perform fractional motion estimation for each reference frame. Further at step 316 the fractional sample interpolation and the fractional-pixel motion estimation is performed for each reference frame and the best predicted data result obtained at the end of the fractional-pixel motion estimation process is transferred from the first level of memory to a second level of memory along with a best motion information at step 318. Thus the best predicted data is further transferred from the second level of memory to a first level of memory at step 320 and performs the reconstruction process of a macro block.

Figure 4:
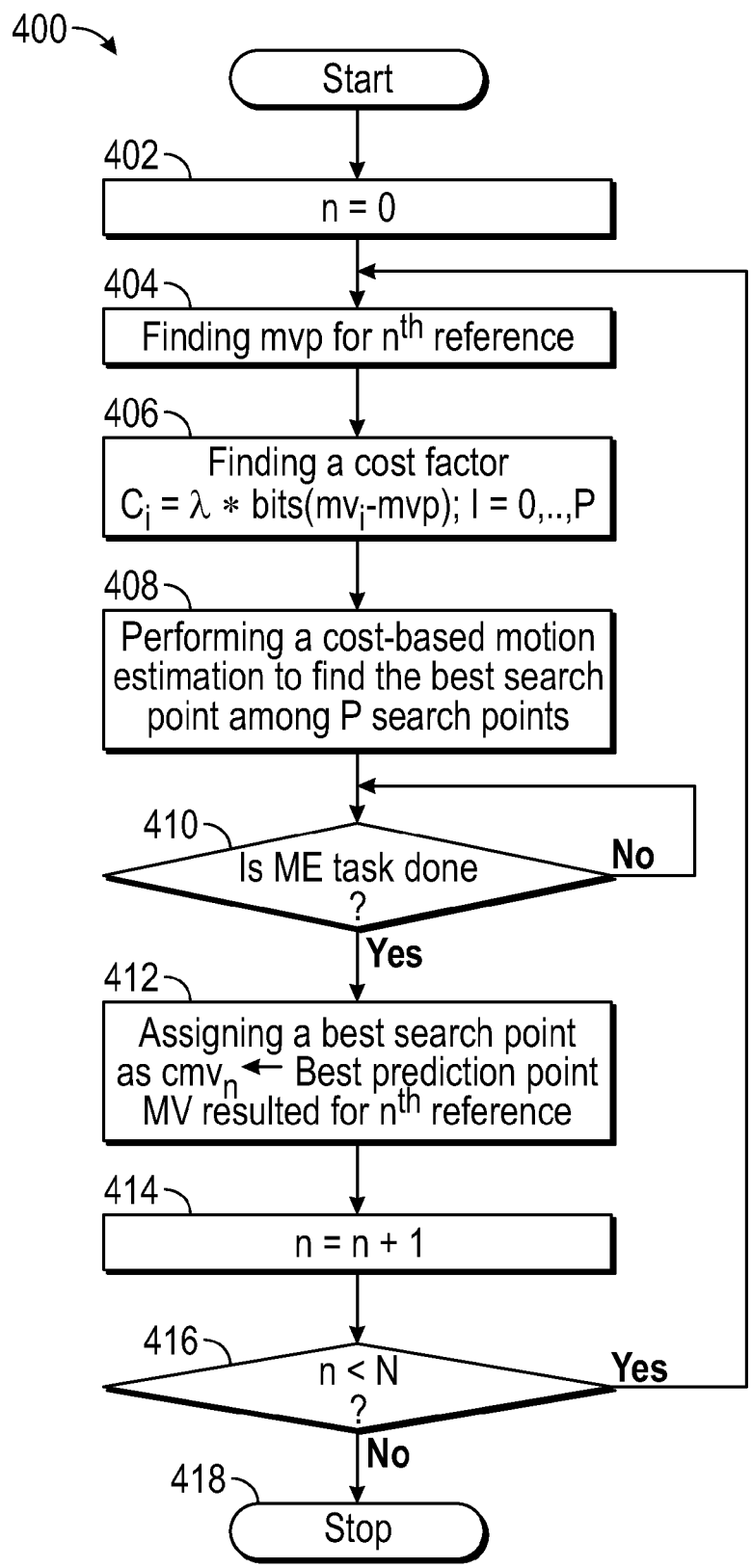
FIG. 4 is a flow diagram depicting a method employed for finding a best prediction point motion vector at a third pipeline stage.

Referring to FIG. 4 is a flow diagram 400 depicting a method employed for finding a best prediction point motion vector at a third pipeline stage. According to a non limiting exemplary embodiment of the present invention, the method of finding a best motion vector at a third pipeline stage starts at step 402 by assigning the number of reference frame value to zero as n=0. At step 404 the predicted motion vector point of the assigned $n^{th}$ reference frame is found and the cost factor values are calculated at step 406 by multiplying the lamda value with the subtraction of motion vector bits and predicted motion vector bits. The cost factor value corresponding to each predicted motion vector is denoted by $C_i$, i=0, 1, P, where P denotes the number of motion vectors available on set Sn.

In accordance with a non limiting exemplary embodiment of the present invention, at step 408 the maximum partition mode of a motion estimation engine is configured to find the best search point among a multiple 'P' search points for starting the motion estimation task. Next at step 410 a condition is provided to determine whether the motion estimation task is performed or not. If the motion estimation task is found to be performed the method continues with the step 412 and if the motion estimation task is not performed the method continues with the step 410. Thus the method continuing with the step 412 assigns the best prediction point motion vector result obtained for $n^{th}$ reference frame to a centre motion vector cmvn and then the value of reference frame is been increased by one as n+1 at step 414. Further at step 416 a condition is being provided to determine whether the increased value of reference frame number is less than the number of reference frames or not. If the reference frame number is found to be less than the number of reference frames then the method continues with step 404 and if the reference frame number is found to be greater than or equal to the number of reference frames the method stops at step 418.

Figure 5:
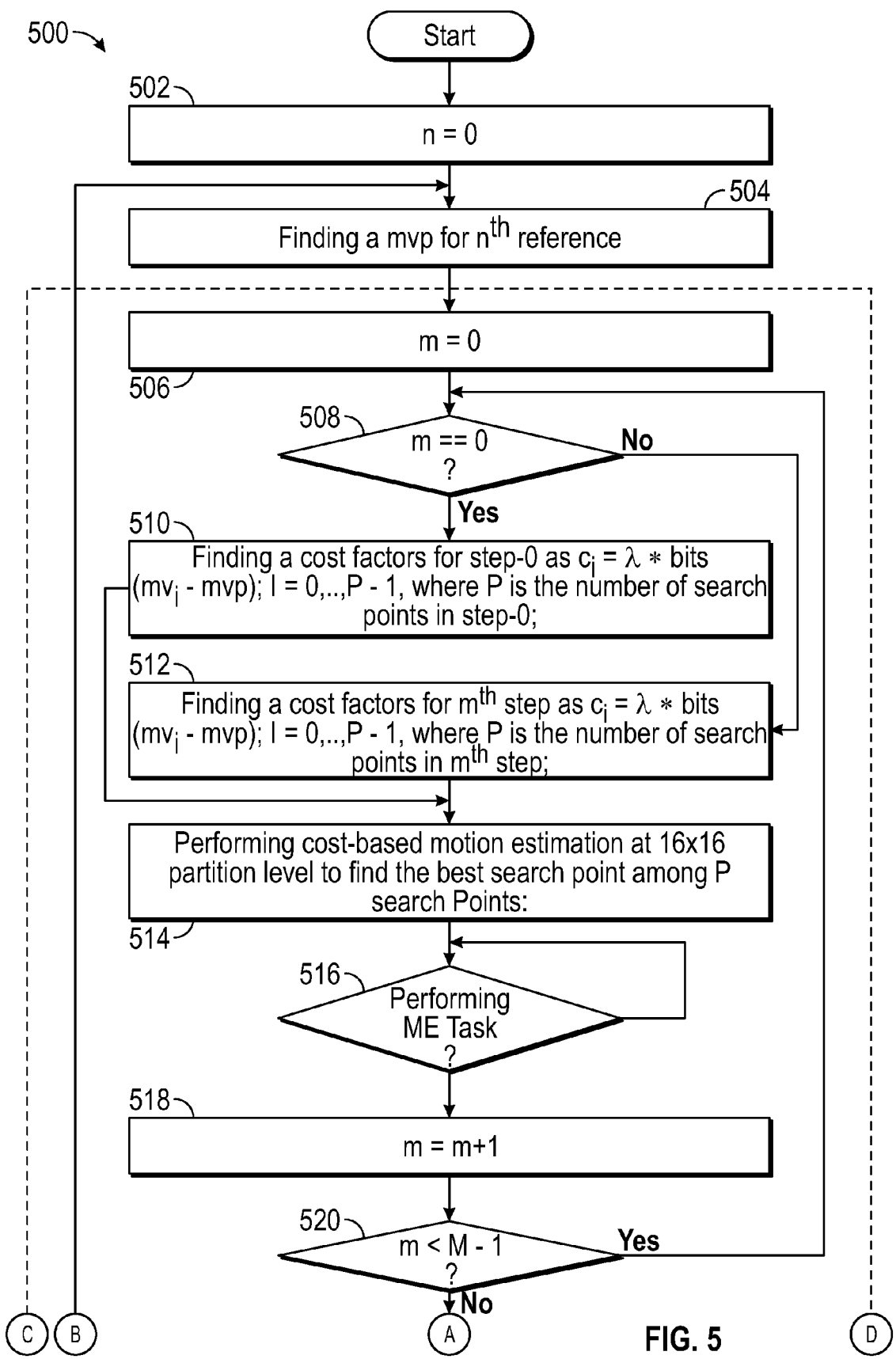
FIG. 5 is a flow diagram depicting a method employed for mapping a best partition mode of a $n^{th}$ reference frame by utilizing an integer-pixel motion estimation at a sixth pipeline stage.
Figure 5:
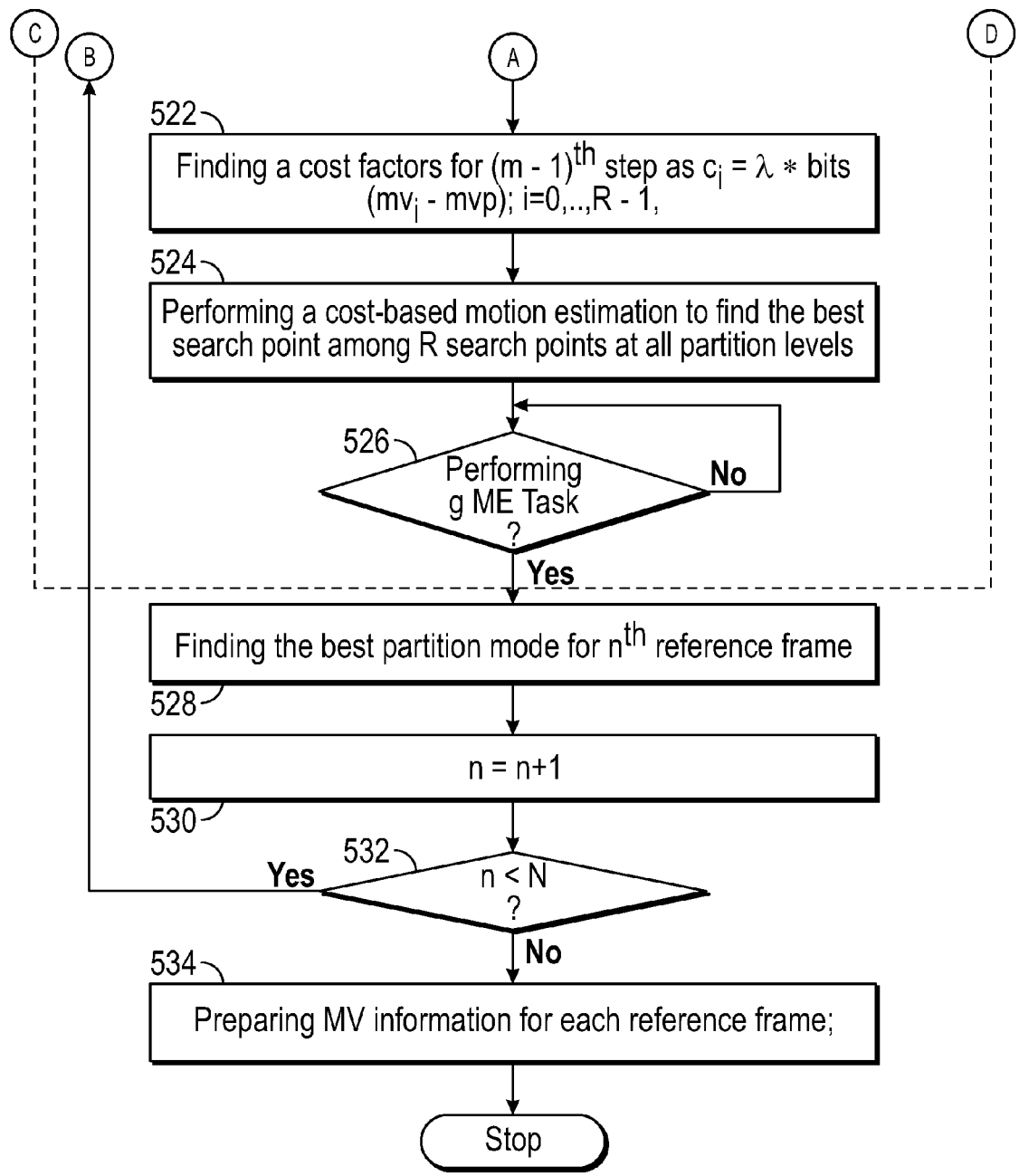

Referring to FIG. 5 is a flow diagram 500 depicting a method employed for finding a best partition mode of a $n^{th}$ reference frame by utilizing an integer-pixel motion estimation at a sixth pipeline stage. According to a non limiting exemplary embodiment of the present invention, a motion search area is selected around a centre motion vector for performing exhaustive motion search for $n^{th}$ reference frame. At a fourth pipeline stage the search area around the centre motion vectors are fetched from the respective reference frame buffers available in an external memory and placed in a second level of memory, where the size of search area depends on the search pattern used in integer-pixel motion estimation and filter-tap lengths used in fractional-pixel motion estimation. Thus at fifth pipeline stage, the search areas are transferred from second level of memory to a first level of memory in a first digital signal processor DSP-0 using a dynamic access memory controller.

In accordance with a non limiting exemplary embodiment of the present invention, the method of mapping a best partition mode of a $n^{th}$ reference frame by utilizing an integer-pixel motion estimation at a sixth pipeline stage starts at step 502 by assigning the number of reference frame value to zero as n=0. At step 504 the prediction point motion vector of the assigned $n^{th}$ reference frame is calculated According to a non limiting exemplary embodiment of the present invention, the step 506 starts the coarse-grain motion estimation search by considering the value of an 'm' to zero where the 'm' value is referred as the number of steps used in integer pixel motion estimation. Next at step 508 a condition is provided to determine whether the m value is equal to zero or not, if the m value is found to be zero the cost factor for step zero is calculated from the set of motion vectors for step zero using the n number of centre motion vectors at step 510. The cost factors at step 510 are calculated by multiplying the lamda value with the subtraction of motion vector bits(mvi) and predicted motion vector bits (mvp) for all P search points in step-0 and continues with the step 514. If the m value is found to be not equal to zero at step 508 the cost factors for $m^{th}$ step are found at step 512. The cost factors at step 512 are calculated by multiplying the lamda value with the subtraction of motion vector bits(mvi) and predicted motion vector bits(mvp) for all P search points in $m^{th}$ step and further continues with the step 514.

In accordance with a non limiting exemplary embodiment of the present invention, at step 514 the cost based motion estimation is performed at a maximum partition level among a multiple partition levels which include a 16×16 partition level to find a best search point among the number of p search points for stating the motion estimation tasks. Next at step 516 a condition is provided to determine whether the motion estimation is performed or not, if the motion estimation task is performed at step 516 the method continues with the step 518 and if the motion estimation task is found to be not performed at step 516 the method continues with the step 516 again. Further at step 518 the m value is increased by one and verifies a condition at step 520 to determine whether the step value(m value) is found to be less than the M-1 step value or not, if the m value is found to be less than the M-1 step value the method continues with the step 508 and if the m value is found to be not less than the M-1 step value the method continues with fine-grain motion estimation step which starts at step 522.

According to a non limiting exemplary embodiment of the present invention, at step 522 the cost factors for $(M-1)^{th}$ step are found from the set of motion vectors for $(M-1)^{th}$ step. The cost factors at step 522 are calculated by multiplying the lamda value with the subtraction of motion vector bits(mvi) and predicted motion vector bits(mvp) for all R search points in (M-1)-step. Next at step 524 the maximum partition mode from a plurality of partition modes of a motion estimation engine to find a best search point among an R search points and starts the motion estimation task at step 526. Further at step 526 a condition is provided to determine whether the motion estimation task to performed or not, if the motion estimation task is determined to be true and the method continues with the step 528 and if the motion estimation task is not determined to be true the method continues with the step 526.

In accordance with a non limiting exemplary embodiment of the present invention, at step 528 the best partition mode for $n^{th}$ reference frame is found from the rate distortion cost of 16×16 partition level obtained from fine-grain motion estimation and update the 16×16 partition level by adding the rate distortion cost of 16×16 value with the value obtained by multiplying the lamda with the bits of the 16×16 partition mode. The rate distortion cost of remaining partition levels which may include but not limited to a 16×8, 8×16, 8×8 and the like obtained from the fine-grain motion estimation are also utilized at step 528 for calculating the minimum rate distortion cost of R16×16, R16×8, R8×16, R8×8 and assigned to Rn. The assigned Rn value is used to find the partition number corresponding to Rn and assigned as best partition of $n^{th}$ reference frame (Best $part_n$).

According to a non limiting exemplary embodiment of the present invention, next at step 530 the n value which refers to the reference frame number is increased by one as n+1 and a condition is checked at step 532 to determine that whether the increased value of reference frame number is less than the number of reference frames 'N' or not. If the reference frame number is found to be less than the number of reference frames 'N' then the method continues with step 504 and if the reference frame number is found to be greater than or equal to the number of reference frames the method continues with the step 534 where the left macro blocks of motion information is updated and the best motion vector information which may include but not limited to a partition mode, motion vectors of multiple partition modes and sum of absolute difference value and the like of each reference frame is sent to the second digital signal processor through a data bus connected between the first digital signal processor and the second digital signal processor.

Figure 6:
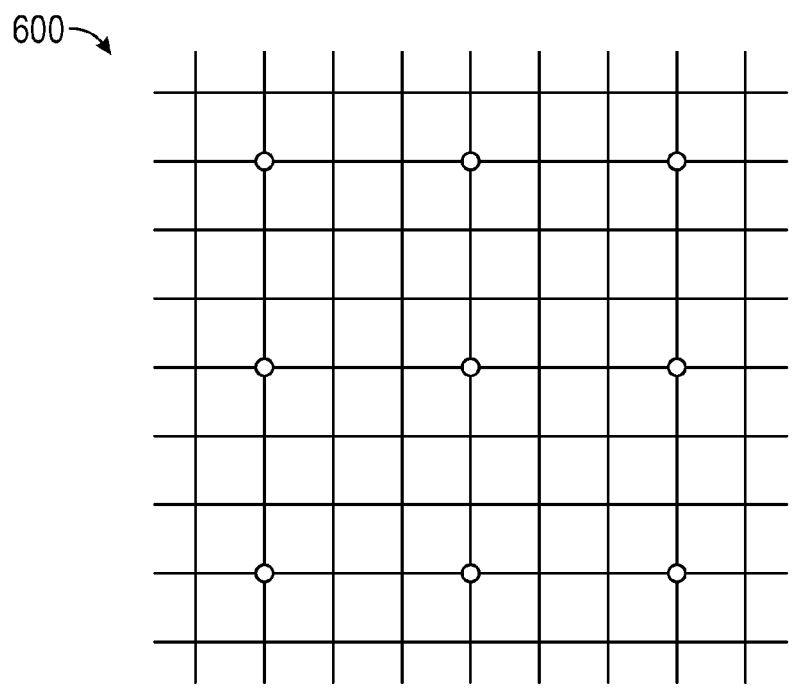
FIG. 6 is a diagram depicting a search pattern utilized in a coarse-grain motion estimation step.

Referring to FIG. 6 is a diagram 600 depicting a search pattern utilized in a coarse-grain motion estimation step. According to a non limiting exemplary embodiment of the present invention, the integer pixel motion estimation performs an exhaustive motion search for $n^{th}$ reference frame by carrying out 'M' steps on each reference frame's search area. The prediction motion vector mvp for each reference frame is calculated by considering the motion vectors of adjacent blocks available in macro blocks and a respective left macro block. If the final motion vector information of left macro block is not available due to the unfinished fractional-pixel motion estimation process a nearest motion vector information of left macro block in mvp calculation is considered. Thus the procedure of finding mvp for each reference frame using the neighbouring block motion information is specific to video coding standard.

In accordance with a non limiting exemplary embodiment of the present invention, the search pattern for $0^{th}$ step of integer pixel motion estimation to a search pattern of $m^{th}$ step are a part of coarse-grain motion estimation where a prediction motion vector is calculated and a cost factor for step zero to step m is found from the set of motion vectors from step zero to step m by using the n number of centre motion vectors. The cost factors for step-0 to step-(M-1) are calculated by multiplying the lamda value with the subtraction of motion vector bits(mvi) and predicted motion vector bits(mvp).

Figure 7:
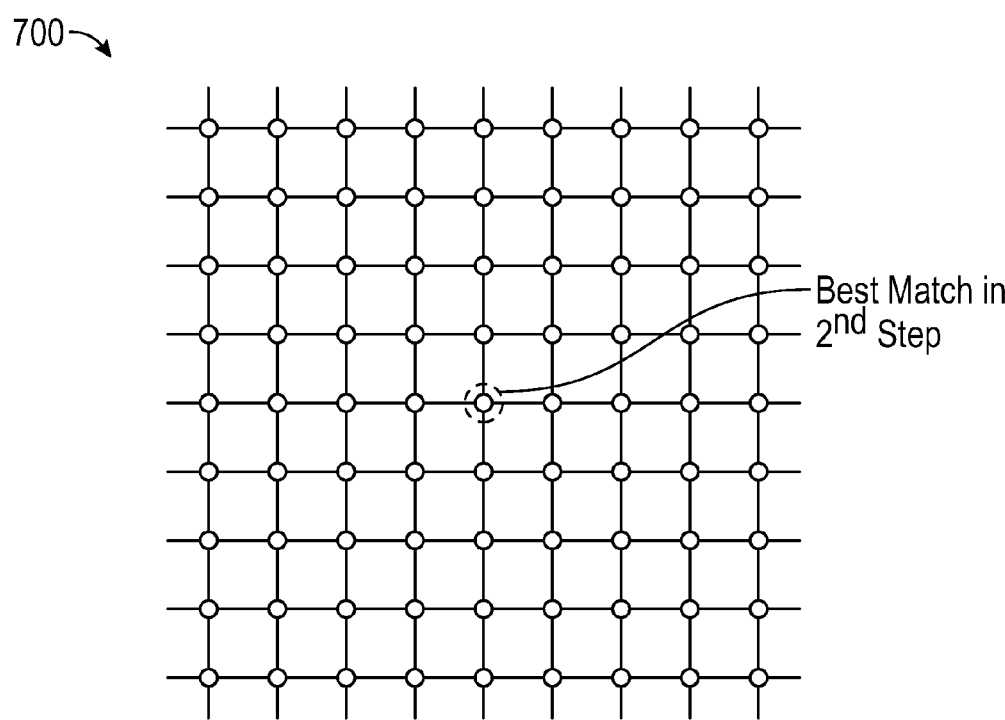
FIG. 7 is a diagram depicting a search pattern utilized in fine-grain motion estimation step.

Referring to FIG. 7 is a diagram 700 depicting a search pattern utilized in a fine-grain motion estimation step. According to a non limiting exemplary embodiment of the present invention, the integer pixel motion estimation performs an exhaustive motion search for $n^{th}$ reference frame by carrying out 'M' steps on each reference frame's search area. The search pattern for $(M-1)^{th}$ step of integer pixel motion estimation is a part of fine-grain motion estimation where a prediction motion vector is calculated and a cost factor for step M-1 is found from the set of motion vectors of step M-1 by using the N number of centre motion vectors. The cost factors for step-(M-1) is calculated by multiplying the lamda value with the subtraction of motion vector bits(mvi) and predicted motion vector bits(mvp).

In accordance with a non limiting exemplary implementation of the present invention, the best motion information of multiple reference frames is available at the end of integer-pixel motion estimation. The available set of rate distortion costs {R0, R1, Rn-1} of multiple reference frames and a set of best partition modes {bestpart0, bestpart1, bestpartn-1} are the corresponding best partition modes of the multiple reference frames. Thus to find the best reference frame the rate distortion cost Rn is updated by adding the rate distortion cost value Rn with a value obtained by multiplying the lamda with a bits(n), where n=0, 1, N-1. The best reference frame in which the best integer-pixel motion estimation search point occurred is calculated by comparing the rate-distortion costs as min {R0, R1, RN-1}.

According to a non limiting exemplary embodiment of the present invention, the reference data sufficient for fractional-pixel interpolation is transferred from second level of memory to the first level of memory in second digital signal processor at a seventh pipeline stage. The second digital signal processor is configured with the input dynamic memory access paths according to the best integer-pixel motion estimation motion vector and a best partition mode of each reference frame. The second digital signal processor also initiates one more dynamic memory access input from $0^{th}$ reference buffer along with the dynamic memory paths, which is derived from the predictive-skip motion vector.

To perform these data transfers in an efficient manner dynamic memory access controller has a special feature called byte-interleaving which is used to transfer data from any byte address location even though if the second level of memory is a 32-bit addressing memory.

Figure 8:
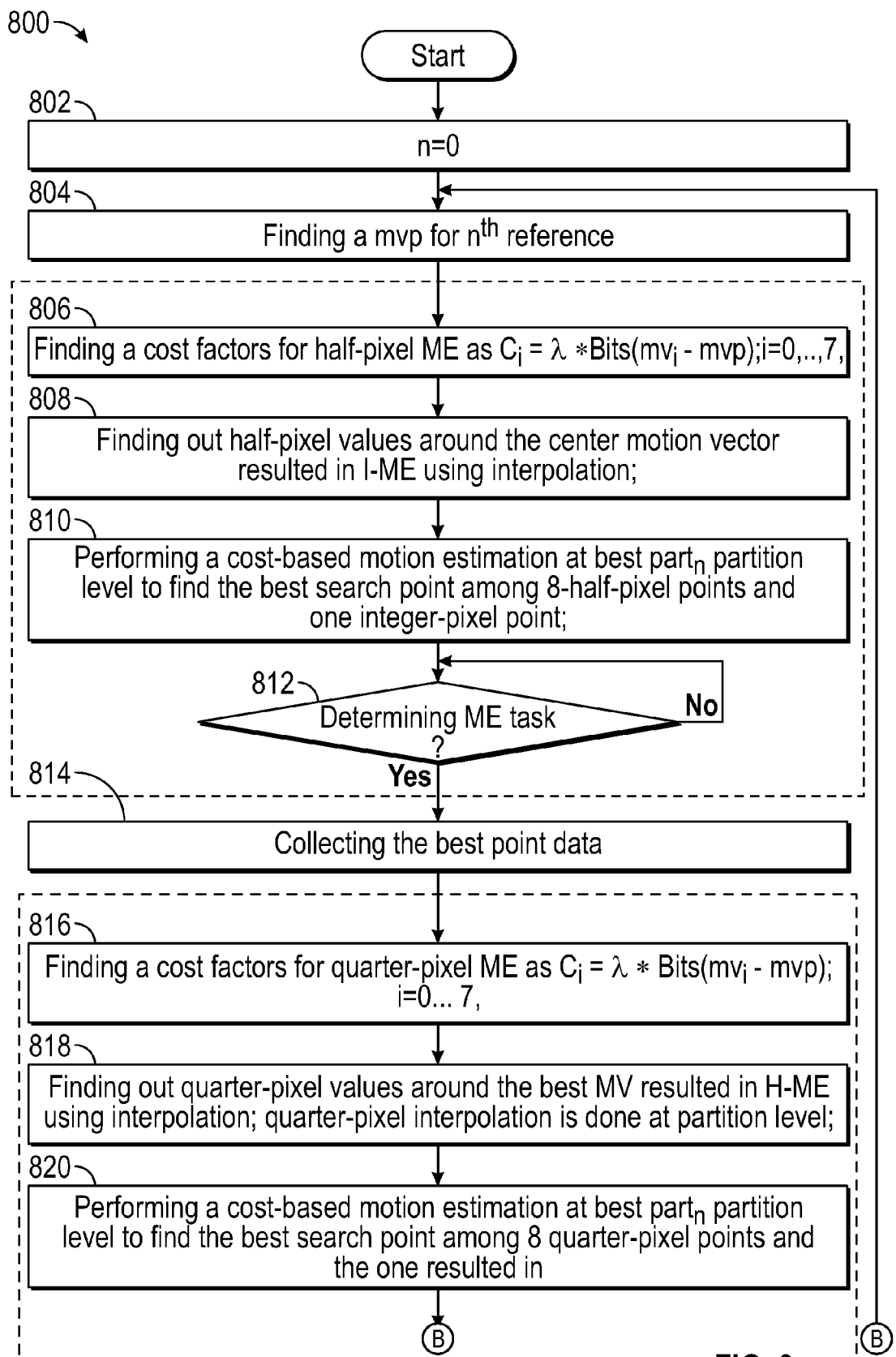
FIG. 8 is a flow diagram depicting a method employed for finding best match by utilizing a fractional-pixel motion estimation task at an eighth pipeline stage.
Figure 8:
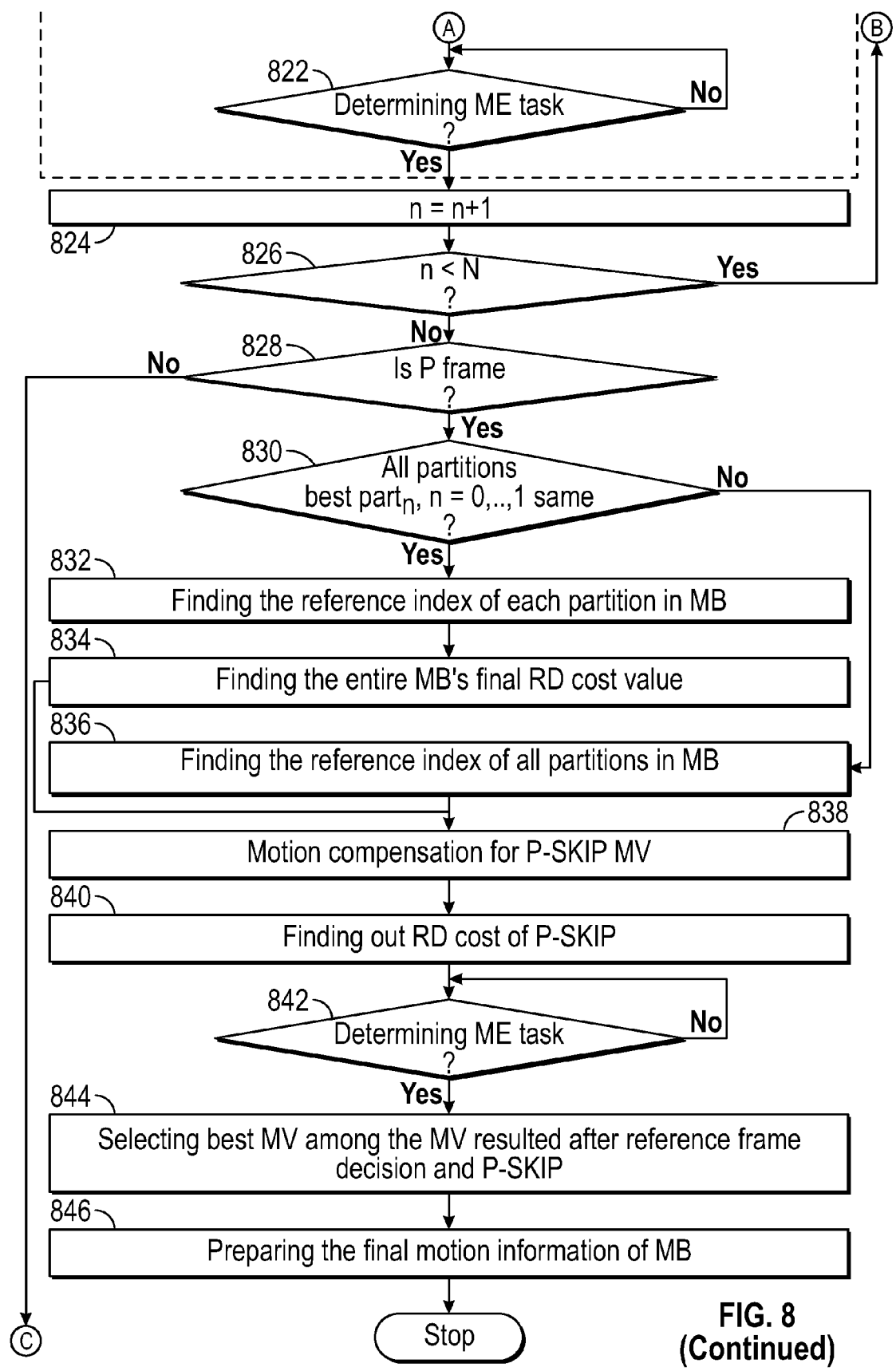
Figure 8:
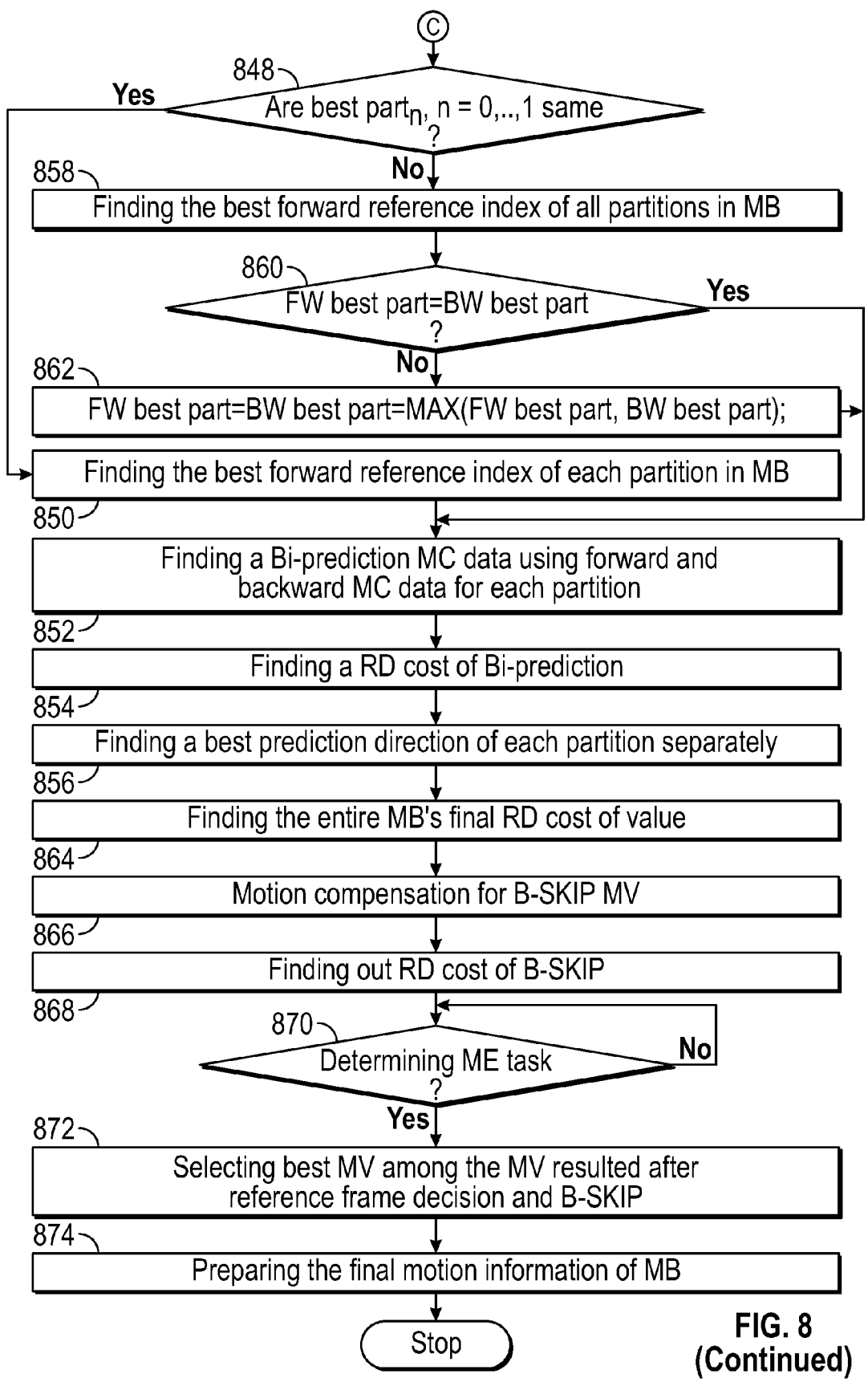

Referring to FIG. 8 is a flow diagram 800 depicting a method employed for mapping a best reference frame by utilizing a fractional-pixel motion estimation task at an eighth pipeline stage. According to a non limiting exemplary embodiment of the present invention, the method of finding a best reference frame at an eighth pipeline stage and mapping on a second digital signal process starts at step 802 by assigning the number of reference frame value to zero as n=0. At step 804 the prediction point motion vector of the assigned $n^{th}$ reference frame is calculated by using a fractional-pixel motion estimation algorithm in eight steps which includes the eight half pixel blocks and eight quarter pixel blocks.

In accordance with a non limiting exemplary embodiment of the present invention, at step 806 the eight half-pixel motion estimation stage is started by calculating the cost factors for half-pixel motion estimation. The cost factors at step 806 are calculated by multiplying the lamda value with the subtraction of motion vector bits(mvi) and predicted motion vector bits(mvp) and the bits of motion vector(mvi) value 'i' ranges from 0, 1, . . . 7. Next at step 808 the half pixel values around the centre motion vector are found by the results obtained from the integer-pixel motion estimation using interpolation which is being processed at partition level and the task performed at this step is mapped on a data centric processor. At step 810 the best partition mode is configured in the motion estimation engine and also the best search point found among the eight half-pixel points is configured in the motion estimation engine and further starts the motion estimation engine.

According to a non limiting exemplary embodiment of the present invention, at step 812 a condition is being provided to determine whether the motion estimation task is performed or not. If the motion estimation task is found to performed the method continues with the step 814 and if the motion estimation task is found to be not performed then the step continues again with the step 812. At step 814 the best data point which may include but not limited to a half-pixel, an integer-pixel and the like is read from the output registers of motion estimation engine. Further the quart-pixel motion estimation engine starts at step 816 by calculating the cost factor for quarter-pixel motion estimation found from the set of motion vectors. The cost factor at step 816 is calculated by multiplying the lamda value with the subtraction of motion vector bits(mvi) and predicted motion vector bits (mvp) and the bits of motion vector(mvi) value 'i' ranges from 0, 1, . . . 7 and configuring the cost factor values Ci to the motion estimation engine.

In accordance with a non limiting exemplary embodiment of the present invention, at step 818 the quarter-pixel values around the centre motion vector are found and the quarter-pixel interpolation is being processed at partition level and the task performed at this step is mapped on a data centric processor. Next at step 820 the best partition mode is configured in the motion estimation engine to find the best search point found among the eight quarter-pixel points and further starts the motion estimation engine. Further at step 822 a condition is being provided to determine whether the motion estimation task is performed or not. If the motion estimation task is found to performed the method continues with the step 824 and if the motion estimation task is found to be not performed then the step continues again with the step 822.

According to a non limiting exemplary embodiment of the present invention, at step 824 the number of reference frame value is increased by one as n+1 and a condition is provided at step 826 to determine whether the increased value of reference frame number is less than the number of reference frames or not. If the reference frame number is found to be less than the number of reference frames then the method goes back to the step 804 and if the reference frame number is found to be greater than or equal to the number of reference frames the method goes to the step 828. At step 828 a condition is provided to determine whether the method being performed is a predictive frame or not, if it is found to be a predictive frame the method continues with the step 830 and if it is not found to be a predictive frame the method continues with the step 848.

In accordance with a non limiting exemplary embodiment of the present invention, the method continuing with the step 830 is provided with a condition to determine whether the all the partitions BestPartn, n is equal to 0, 1, . . . N-1 are same or not. If they are found to be same the method continues with the step 832 and if they are found to be different then the method continues with the step 836. Thus at step 832 the reference index of each partition in a macro-block are found separately by considering the rate distortion cost values and reference index weight factor. Further at step 834 the entire macro block's rate distortion cost values are found and continued with the step 838. If the condition provided at step 830 is not found to be equal then the method continues with the step 836, where the reference index of all partitions in a macro-block is found combinedly by considering the rate-distortion costs, reference index weight factor and partition mode weight factors and continues with the step 838.

According to a non limiting exemplary embodiment of the present invention, at step 838 the motion compensation for predictive-skip motion vector is found and the task performed is mapped on the data centric processor. Next at step 840 the maximum partition mode which may include but not limited to a 16×16 partition mode and the like configured in the motion estimation engine is used to find the rate distortion cost at a predictive-skip point and starts a motion estimation engine. Thus at step 842 a condition is provided to determine whether the motion estimation task is performed or not, if the motion estimation task is found to be performed the method continues with the step 844 and if the motion estimation task is not found to be performed then the method continues with the step 842. At step 844 the best motion vector between the motion vector resulted after calculating the quarter-pixel motion estimation and a predictive-skip motion vector is selected and a final motion information of macro block is being prepared at step 846. The final motion information which may include but not limited to a set of motion vectors, set of reference indices, partition made and the like.

In accordance with a non limiting exemplary embodiment of the present invention, the method continues with the step 848 if the identified frame is not found to be a predictive frame at step 828. The step 848 is provided with a condition to determine whether all the partitions BestPart$_n$, n are equal to 0, 1, . . . N-1 are same or not. If they are found to be same the method continues with the step 850 and if they are found to be different then the method continues with the step 858. Thus at step 850 to find the best forward reference index of the each partition in macro block separately by considering the rate distortion cost factor and reference index weight factor. Next at step 852 the bi-direction motion compensation data is found by using the forward and backward motion compensation data for each partition and at step 854 the rate distortion cost of bi-prediction motion vector is calculated. Further at step 856 the best prediction direction of each partition is separately calculated and continues with the step 864.

According to a non limiting exemplary embodiment of the present invention, if the best partitions obtained from multiple partitions are from 0 . . . N-1 in case of a bi-predictive frame at step 848 are not found to be same then the method continues with the step 858 to find the best forward reference index of all partitions in a macro block combinedly by considering the rate distortion cost factor, reference index weight factor and partition mode weight factor. Next at step 860 a condition is being provided to determine that whether the forward best partition is equal to the backward best partition or not. If the forward best partition is found to be equal to the backward best partition then the method continues with the step 852 and if the forward best partition is found to be not equal to the backward best partition then the method continues with the step 862 where the maximum value of forward best partition and backward best partition are assigned to the forward best partition and the backward best partition and continues with the step 852.

In accordance with a non limiting exemplary embodiment of the present invention, after finding the best prediction direction of each partition at step 856 separately the method continues with the step 864 to find the entire macro blocks rate distortion cost value. Next at step 866 the motion compensation of bi-predictive skip motion vector is being calculated and the task performed is being mapped on a data centric processor. Further at step 868 the maximum partition level which may include but not limited to a 16×16 partition level and the like is configured in the motion estimation engine to find a rate-distortion cost at bidirectional predictive-skip point and starts performing the motion estimation task.

According to a non limiting exemplary embodiment of the present invention, at step 870 a condition is being provided to determine whether the motion task is performed or not. If the motion estimation task is found to be performed at step 870 the method continues with the step 872 and if the motion estimation task is found to be not performed at step 870 the method again further continues with the step 870. Thus at step 872 the best motion vector between the motion vector resulted after calculating the quarter-pixel motion estimation and bidirectional predictive-skip point motion vector is being selected and the final motion information which may include but not limited to a set of motion vectors, set of reference indices and partition mode and the like of macro block are prepared at step 874.

Figure 9:
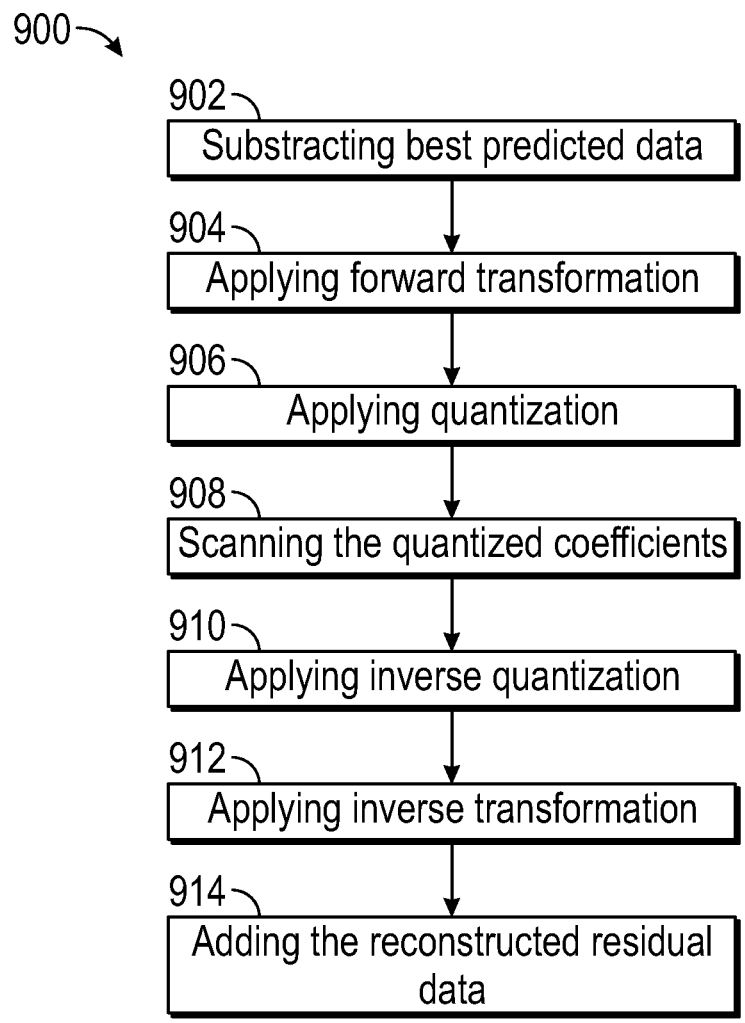
FIG. 9 is a flow depicting a method employed for reconstructing a macro block and mapping of pipeline stages.

Referring to FIG. 9 is a diagram 900 depicting a method employed for reconstructing a macro block and mapping of pipeline stages in reconstruction stage. According to a non limiting exemplary embodiment of the present invention, after completing the fractional-pixel motion estimation at an eighth pipeline stage the motion compensated data of size which may include but not limited to a 256 pixels and the like and the final motion information data which may include but not limited to a set of motion vectors, set of reference indices and partition mode and the like is transferred from first level of memory in second digital signal processor to second level of memory communicating with the processor at ninth pipeline stage. Further at tenth pipeline stage the motion compensated data and motion vector information are transferred from second level of memory to a first level of memory in first digital signal processor.

In accordance with a non limiting exemplary embodiment of the present invention, the method of reconstructing a macro block starts at step 902 by subtracting the best predicted data which may include but not limited to a motion compensated data and the like from an original data to form a residual data. Next at step 904 the forward transformation is being applied on the residual data and the method of quantization is applied on transformed coefficients at step 906. Further at step 908 the zigzag-scanning process is used for the quantized coefficients and inverse-quantization is applied on the quantized coefficients at step 910.

According to a non limiting exemplary embodiment of the present invention, at step 912 an inverse transformation is applied to get the reconstructed residual data and the reconstructed residual data is further added with the motion compensated data to reconstruct a macro block data at step 914. Thus the reconstructed macro block is written in reference frame buffers and the motion information is written in the co-located motion vector buffers residing in the external memory and further the motion vector information stored in co-located motion vector buffers are used for calculating the prediction point motion vectors as done in the first pipeline stage PS0.

In accordance with a non limiting exemplary embodiment of the present invention, the method of mapping motion estimation algorithm pipeline stages on a dual core digital signal processor is described in the table given below:

block (PS1(0)) of the motion estimation on the dynamic memory access controller of the second digital signal processor and the first pipeline stage corresponding to the second macro block (PS0(1)) of the motion estimation on the data centric processor of the second digital signal processor and the external double data rate controller.

According to a non limiting exemplary embodiment of the present invention, the third time slot of the single macro block (2) is used to map the second pipeline stage corresponding to the second macro block (PS1(1)) of the motion estimation on the dynamic memory access controller of the second digital signal processor. The first pipeline stage corresponding to the third macro block (PS0(2)) of the motion estimation is mapped on the data centric processor of the second digital signal processor and the external double data rate controller and the third pipeline stage corresponding to the first macro block (PS2(0)) of the motion estimation is mapped on the programmable motion estimation engine of the second digital signal processor in the same time slot three (2). Next at fourth time slot of the single macro block (3), the second pipeline stage corresponding to the third macro block (PS1(2)) of the motion estimation is mapped on the dynamic memory access controller of the second digital signal processor. The first pipeline stage corresponding to the fourth macro block (PS0(3)) of the motion estimation is mapped on the data centric processor of the second digital signal processor and the external double data rate controller and the third pipeline stage corresponding to the second macro block (PS2(1)) of the motion

| | DSP-0 | | | DSP-1 | | | External |
|---|---|---|---|---|---|---|---|
| Time | DMA Controller | Data Processor | ME Engine | DMA Controller | Data Processor | ME Engine | DDR Controller |
| 0 | | | | | PS0(0) | | PS0(0) |
| 1 | | | | PS1(0) | PS0(1) | | PS0(1) |
| 2 | | | | PS1(1) | PS0(2) | PS2(0) | PS0(2) |
| 3 | | | | PS1(2) | PS0(3) | PS2(1) | PS0(3) + PS3(0) |
| 4 | PS4(0) | | | PS1(3) | PS0(4) | PS2(2) | PS0(4) + PS3(1) |
| 5 | PS4(1) | | PS5(0) | PS1(4) | PS0(5) | PS2(3) | PS0(5) + PS3(2) |
| 6 | PS4(2) | | PS5(1) | PS1(5) + PS6(0) | PS0(6) | PS2(4) | PS0(6) + PS3(3) |
| 7 | PS4(3) | | PS5(2) | PS1(6) + PS6(1) | PS0(7) + PS7(0) | PS2(5) + PS7(0) | PS0(7) + PS3(4) |
| 8 | PS4(4) | | PS5(3) | PS1(7) + PS6(2) + PS8(0) | PS0(8) + PS7(1) | PS2(6) + PS7(1) | PS0(8) + PS3(5) |
| 9 | PS4(5) + PS9(0) | PS9(0) | PS5(4) | PS1(8) + PS6(3) + PS8(1) | PS0(9) + PS7(2) | PS2(7) + PS7(2) | PS0(9) + PS3(6) |
| 10 | PS4(6) + PS9(1) | PS9(1) | PS5(5) | PS1(9) + PS6(4) + PS8(2) | PS0(10) + PS7(3) | PS2(8) + PS7(3) | PS0(10) + PS3(7) |

The method of mapping a motion estimation pipeline stages is being processed on a dual core digital signal processor and an external double data rate controller. Each core of digital signal processor includes a dynamic memory access controller, a programmable motion estimation engine and a data centric processor. The first time slot of single macro block (0) is used to map the first pipeline stage corresponding to the first macro block zero (PS0(0)) of the motion estimation on the data centric processor of second digital signal processor and on an external double data rate controller. The second time slot of the single macro block (1) is used to map the second pipeline stage corresponding to the first macro estimation is mapped on the programmable motion estimation engine of the second digital signal processor and also an external double data rate controller also runs a fourth pipeline stage corresponding to the first macro block (PS3 (0)) are mapped on the same time slot four (3).

In accordance with a non limiting exemplary embodiment of the present invention, the fifth time slot of the single macro block (4) is used to map the fifth pipeline stage corresponding to the first macro block (PS4(0)) on the dynamic memory access controller of first digital signal processor. The second pipeline stage corresponding to the fourth macro block (PS1(3)) of the motion estimation is mapped on the dynamic memory access controller of the second digital signal processor at the same time slot. The first pipeline stage corresponding to the fifth macro block (PS0(4)) of the motion estimation is mapped on the data centric processor of the second digital signal processor and the external double data rate controller and the third pipeline stage corresponding to the third macro block (PS2(2)) of the motion estimation is mapped on the programmable motion estimation engine of the second digital signal processor and also an external double data rate controller also runs a fourth pipeline stage corresponding to the second macro block (PS3(1)) on the same fifth time slot (4).

According to a non limiting exemplary embodiment of the present invention, the sixth time slot of the single macro block (5) is used to map the fifth pipeline stage corresponding to the second macro block (PS4(1)) on the dynamic memory access controller of first digital signal processor. The sixth pipeline stage corresponding to the first macro block (PS5(0)) is mapped on the programmable motion estimation engine of the first digital signal processor at the same sixth time slot(5). Similarly the same sixth time slot is used for mapping the second pipeline stage corresponding to the fifth macro block (PS1(4)) of the motion estimation on the dynamic memory access controller of the second digital signal processor. The first pipeline stage corresponding to the sixth macro block (PS0(5)) of the motion estimation is mapped on the data centric processor of the second digital signal processor and the external double data rate controller and the third pipeline stage corresponding to the fourth macro block (PS2(3)) of the motion estimation is mapped on the programmable motion estimation engine of the second digital signal processor and also an external double data rate controller also runs a fourth pipeline stage corresponding to the third macro block (PS3(2)) in same sixth time slot(5).

In accordance with a non limiting exemplary embodiment of the present invention, the seventh time slot of the single macro block (6) is used to map the fifth pipeline stage corresponding to the third macro block (PS4(2)) on the dynamic memory access controller of first digital signal processor. The sixth pipeline stage corresponding to the second macro block (PS5(1)) is mapped on the programmable motion estimation engine of the first digital signal processor at the seventh time slot(6). Similarly the same seventh time slot is used for mapping the second pipeline stage corresponding to the sixth macro block (PS1(5)) of the motion estimation on the dynamic memory access controller of the second digital signal processor and also the seventh pipeline stage corresponding to the first macro block (PS6(0)) on the dynamic memory access controller of the second digital signal processor. The first pipeline stage corresponding to the seventh macro block (PS0(6)) of the motion estimation is mapped on the data centric processor of the second digital signal processor and the external double data rate controller and the third pipeline stage corresponding to the fifth macro block (PS2(4)) of the motion estimation is mapped on the programmable motion estimation engine of the second digital signal processor and also an external double data rate controller also runs a fourth pipeline stage corresponding to the fourth macro block (PS3(3)) at a seventh time slot(6).

According to a non limiting exemplary embodiment of the present invention, the eighth time slot of the single macro block (7) is used to map the fifth pipeline stage corresponding to the fourth macro block (PS4(3)) on the dynamic memory access controller of first digital signal processor. The sixth pipeline stage corresponding to the third macro block (PS5(2)) is mapped on the programmable motion estimation engine of the first digital signal processor at the eighth time slot(7). Similarly the same eighth time slot is used for mapping the second pipeline stage corresponding to the seventh macro block (PS1(6)) of the motion estimation on the dynamic memory access controller of the second digital signal processor and also the seventh pipeline stage corresponding to the second macro block (PS6(1)) on the dynamic memory access controller of the second digital signal processor. The first pipeline stage corresponding to the eight macro block (PS0(7)) of the motion estimation is mapped on the data centric processor of the second digital signal processor and the external double data rate controller at the eighth time slot.

In accordance with a non limiting exemplary embodiment of the present invention, the eighth pipeline stage corresponding to the first macro block (PS7(0)) is mapped on both the data centric processor and the programmable motion estimation engine of the second digital signal processor at the eighth time slot(7) and further the third pipeline stage corresponding to the sixth macro block (PS2(5)) of the motion estimation runs on the programmable motion estimation engine of the second digital signal processor and the external double data rate controller also runs a fourth pipeline stage corresponding to the fifth macro block (PS3(4)) on the same time slot(7).

According to a non limiting exemplary embodiment of the present invention, the ninth time slot of the single macro block (8) is used to map the fifth pipeline stage corresponding to the fifth macro block (PS4(4)) on the dynamic memory access controller of first digital signal processor. The sixth pipeline stage corresponding to the fourth macro block (PS5(3)) is mapped on the programmable motion estimation engine of the first digital signal processor at ninth time slot. The dynamic memory access controller maps the second pipeline stage corresponding to the eighth macro block (PS1(7)) of the motion estimation, the seventh pipeline stage corresponding to the third macro block (PS6(2)) and also the ninth pipeline stage corresponding to the first macro block (PS8(0)) at the ninth time slot(8). The data centric processor of the second digital signal processor is used to map the first pipeline stage corresponding to the ninth macro block (PS0(8)) and the eighth pipeline stage corresponding to the second macro block (PS7(1)) at the ninth time slot and similarly the programmable motion estimation engine of the second digital signal processor maps the third pipeline stage corresponding to the seventh macro-block (PS2(6)) and the eighth pipeline stage corresponding to the second macro block (PS7(1)) at the same time slot. Further the external double data rate controller runs the fourth pipeline stage corresponding to the sixth macro block (PS3(5)) and the first pipeline stage corresponding to the ninth macro-block (PS0(8)) at the same ninth time slot.

In accordance with a non limiting exemplary embodiment of the present invention, the dynamic memory access controller of the first digital signal processor maps the fifth pipeline stage corresponding to the sixth macro-block (PS4(5)) and also the tenth pipeline stage corresponding to the first macro-block (PS9(0)) on the tenth time slot of single macro block (9). The data centric processor of first digital signal processor also maps the tenth pipeline stage corresponding to the first macro-block (PS9(0)) at the same tenth time slot and the programmable motion estimation engine of the first digital signal processor maps the sixth pipeline stage corresponding to the fifth macro-block (PS5(4)). The dynamic memory access controller of the second digital signal processor maps the second pipeline stage corresponding to the ninth macro block (PS1(8)) of the motion estimation, the seventh pipeline stage corresponding to the fourth macro block (PS6(3)) and also the ninth pipeline stage corresponding to the second macro block (PS8(1)) at the tenth time slot.

According to a non limiting exemplary embodiment of the present invention, the data centric processor of the second digital signal processor maps the first pipeline stage corresponding to the tenth macro block (PS0(9)) and also runs the eighth pipeline stage corresponding to the third macro block (PS7(2)) at the tenth time slot(9). The programmable motion estimation engine of the second digital signal processor maps the third pipeline stage corresponding to the eighth macro-block (PS2(7)) and also runs the eighth pipeline stage corresponding to the third macro block (PS7(2)) at the same time slot and further the external double data rate controller is also used to map the fourth pipeline stage corresponding to the seventh macro block (PS3(6)) and the first pipeline stage corresponding to the tenth macro-block (PS0(9)) at the tenth time slot(9).

In accordance with a non limiting exemplary embodiment of the present invention, the dynamic memory access controller of the first digital signal processor maps the fifth pipeline stage corresponding to the seventh macro-block (PS4(6)) and also runs the tenth pipeline stage corresponding to the second macro-block (PS9(1)) on the eleventh time slot of single macro block (10). The data centric processor of first digital signal processor also maps the tenth pipeline stage corresponding to the second macro-block (PS9(1)) and the programmable motion estimation engine of the first digital signal processor maps the sixth pipeline stage corresponding to the sixth macro-block (PS5(5)) at the eleventh time slot. Similarly the dynamic memory access controller of the second digital signal processor maps the second pipeline stage corresponding to the tenth macro block (PS1(9)) of the motion estimation, the seventh pipeline stage corresponding to the fifth macro block (PS6(4)) and also the ninth pipeline stage corresponding to the third macro block (PS8(2)) at the eleventh time slot.

According to a non limiting exemplary embodiment of the present invention, the data centric processor of the second digital signal processor is used to map the first pipeline stage corresponding to the eleventh macro block (PS0(10)) and also run the eighth pipeline stage corresponding to the fourth macro block (PS7(3)) at the eleventh time slot(10). The programmable motion estimation engine of the second digital signal processor maps the third pipeline stage corresponding to the ninth macro-block (PS2(8)) and also runs the eighth pipeline stage corresponding to the fourth macro block (PS7(3)) at the same time slot. Further the external double data rate controller is used to map the fourth pipeline stage corresponding to the eighth macro block (PS3(7)) and also run the first pipeline stage corresponding to the eleventh macro-block (PS0(10)) at the eleventh time slot (10).

While specific embodiments of the invention have been shown and described in detail to illustrate the inventive principles, it will be understood that the invention may be embodied otherwise without departing from such principles.

What is claimed is:

1. A method of mapping a multiple reference frame motion estimation on a multi core digital signal processor, the method comprising:
    considering at least one motion vector of a plurality of neighbouring macro blocks present in a current frame and a co-located frame to find a best prediction point motion vector set, whereby a current macro block of the current frame and at least one neighbouring macro block of the current frame are co-related with a co-located macro block of the co-located frame and the at least one neighbouring macro block of the co-located frame;
    collecting a best data block among a plurality of data blocks from a plurality of reference frames according to a plurality of sets of motion vectors, whereby the collected best data block to be transferred from an external memory to a second level of memory at a first pipeline stage;
    transmitting a searched data related to the plurality of sets of motion vectors from the second level of memory to a first level of memory of a second digital signal processor at a second pipeline stage;
    finding a best predictive motion vector by utilizing a cost based search on the second digital signal processor at a third pipeline stage comprising:
        finding predictive motion vector by considering a plurality of adjacent motion vectors present in a plurality of neighbouring macro blocks and an availability status of a left macro block;
        finding a cost factor of each motion vector from a plurality of sets of motion vectors and assigning a plurality of results obtained by calculating the cost factor of each motion vector to a plurality of input registers of a motion estimation engine; and
        performing a cost based motion search to find a best predictive motion vector from a plurality of set of predictive motion vectors.

2. A method of mapping an integer-pixel based motion estimation by utilizing multiple reference frames on a multi core digital signal processor, the method comprising:
    collecting a plurality of set of centre motion vectors at an end of the third pipeline stage to perform an exhaustive motion search for a $n^{th}$ reference frame by selecting a motion search area around centre motion vector;
    transmitting a plurality of reference frame buffers of a searched reference frame from an external memory to a second level of memory at a fourth pipeline stage by fetching a search area present around the selected centre motion vector;
    transmitting the fetched search area from the second level of memory to a first level of memory of a first digital signal processor by utilizing a dynamic memory access controller at a fifth pipeline stage;
    performing an integer-pixel level of motion estimation for at least one reference frame in a sixth pipeline stage to find a best motion vector comprising:
        mapping a coarse-grain motion estimation in a first M-1 steps of a plurality of steps from at least one reference frame search area by calculating a weight cost factor value and a sum of absolute difference value to determine a best search point in at least one reference frame search area;
        mapping a fine-grain motion estimation in a last step of a plurality of steps from at least one reference frame search area by calculating a weight cost factor value and a sum of absolute difference value to determine a best search point in at least one reference frame search area; and
        finding a best partition mode for the nth reference frame by calculating a minimum rate distortion cost at a maximum partition level among a plurality of partition levels and a minimum rate distortion cost of remaining partition levels among the plurality of partition levels.

3. The method of claim 2 further comprises a step of calculating a size of a search area depending on a search pattern used in integer-pixel motion estimation and a filter-tap lengths used in a fractional-pixel interpolation process.

4. The method of claim 2 further comprises a step of transmitting an efficient reference data from a second level of memory to a first level of memory of a second digital signal processor in a seventh pipeline stage by utilizing a byte-interleaving feature of a dynamic memory access controller.

5. A method of mapping a fractional-pixel based motion estimation by utilizing multiple reference frames on a multi core digital signal processor, the method comprising:
   performing a half-pixel motion estimation to determine a best search point at an eighth pipeline stage comprising:
      calculating half-pixel values around a centre motion vector resulted in an integer-pixel motion estimation through an interpolation process at a best partition level;
      configuring a motion estimation in a best partition mode and finding a best search point from a plurality of eight half-pixel points.
   performing a quart-pixel motion estimation to determine a best search point at an eighth pipeline stage comprising:
      calculating quarter-pixel values around a best motion vector resulted in half-pixel motion estimation process by utilizing an interpolation at best partition level;
      configuring a motion estimation in a best partition mode to determine a best search point from a plurality of eight quarter-pixel points.
   finding a rate distortion cost of a plurality of prediction frame skip points and a plurality of bidirectional predictive frame skip points by compensating a motion of a plurality of motion vectors; and
   selecting a best motion vector between a motion vector resulted after calculating a quarter-pixel motion estimation and a plurality of prediction skip motion vectors and a bidirectional predictive motion vectors.

6. The method of claim 5, further comprises a step of transmitting a motion compensated data from a first level memory of a second digital signal processor to a second level of memory at a ninth pipeline stage.

7. The method of claim 5, further comprises a step of transmitting a motion compensated data and a motion vector information from a second level of memory to a first level of memory of a first digital signal processor at a tenth pipeline stage.

8. The method of claim 5, further comprises a step of performing a reconstruction of a macro block by utilizing the motion compensated data and the motion information.

9. The method of claim 5, further comprises a step of mapping the motion estimation engines multiple pipeline stages on a dual core digital signal processor.

10. A system for mapping a multiple reference frame motion estimation on a multi core digital signal processor, the system comprising:
   a first digital signal processor in communication with a second digital signal processor through a data bus comprising:
      a programmable motion estimation engine in communication with a first level of memory to receive the data stored in the memory;
      a data centric processor in communication with a first level of memory and a programmable motion estimation engine to map a motion compensated data and a motion vector information of a best reference frame data; and
   a second level of memory in communication with the first digital signal processor and; a second digital signal processor and;
   an external memory to store data buffers utilized for processing.

* * * * *